US012565370B2

(12) United States Patent
Chiang

(10) Patent No.: US 12,565,370 B2
(45) Date of Patent: Mar. 3, 2026

(54) HONEYCOMB CELL SHOCK-PROTECTION PAPER PAD STRUCTURE, AND FABRICATION METHOD AND FABRICATION APPARATUS

(71) Applicant: 1teck Automation Technology Co., Ltd., Tongxiang (CN)

(72) Inventor: Tung-Lung Chiang, Tongxiang (CN)

(73) Assignee: 1TECK AUTOMATION TECHNOLOGY CO., LTD., Tongxiang (CN)

( * ) Notice: Subject to any disclaimer, the term of this patent is extended or adjusted under 35 U.S.C. 154(b) by 49 days.

(21) Appl. No.: 18/256,637

(22) PCT Filed: Dec. 2, 2022

(86) PCT No.: PCT/CN2022/136346
§ 371 (c)(1),
(2) Date: Jun. 9, 2023

(87) PCT Pub. No.: WO2024/113374
PCT Pub. Date: Jun. 6, 2024

(65) Prior Publication Data
US 2024/0383663 A1     Nov. 21, 2024

(51) Int. Cl.
| *B31D 3/04* | (2006.01) |
| *B31D 3/02* | (2006.01) |
| *B65D 81/127* | (2006.01) |
| *B32B 3/12* | (2006.01) |
| *F16F 7/12* | (2006.01) |

(52) U.S. Cl.
CPC ......... *B65D 81/127* (2013.01); *B31D 3/0292* (2013.01); *B31D 3/04* (2013.01); *B32B 3/12* (2013.01); *F16F 7/121* (2013.01)

(58) Field of Classification Search
CPC ....................................................... B31D 3/04
See application file for complete search history.

(56) References Cited

U.S. PATENT DOCUMENTS

| | | | | |
|---|---|---|---|---|
| 2,910,153 A | * | 10/1959 | Campbell | ............... E04C 2/365 |
| | | | | D25/138 |
| 2002/0071933 A1 | * | 6/2002 | Johnson | ............... B31D 3/0223 |
| | | | | 428/116 |
| 2016/0353825 A1 | * | 12/2016 | Bottlang | .................. B32B 3/12 |

* cited by examiner

*Primary Examiner* — Humera N. Sheikh
*Assistant Examiner* — Julia L Rummel
(74) *Attorney, Agent, or Firm* — Birch, Stewart, Kolasch & Birch, LLP

(57) ABSTRACT

Disclosed are a honeycomb cell shock-protection paper pad structure, and a fabrication method and a fabrication apparatus, for overcoming springing back of a stretched honeycomb cell paper shock-protection pad. The honeycomb shock-protection paper pad structure includes paper strips that have an unconnected site of which upper and lower ends are formed with folded-edge bend portions and a connected site that is formed with a central bend portion. A shape-fixing method includes stretching a cellular-form shock-protection paper pad for extension, bending upper and lower ends of the paper strips of the stretched honeycomb cell shock-protection paper pad toward one side, and conducting shape-fixing rolling with paired rollers. A shape-fixing apparatus includes a chassis portion, an edge scraper portion including flexible upper and lower scraper blades mounted obliquely on the chassis portion, and a shape-fixing roller portion including rigid shaping paired roller mounted on the chassis portion.

1 Claim, 6 Drawing Sheets enlarged view showing Portion C

1—1 enlarged view showing Portion D

HONEYCOMB CELL SHOCK-PROTECTION PAPER PAD STRUCTURE, AND FABRICATION METHOD AND FABRICATION APPARATUS

TECHNICAL FIELD OF THE INVENTION

The present invention relates to packaging of articles, and more particularly to a honeycomb cell shock-protection paper pad structure, and a fabrication method and a fabrication apparatus.

DESCRIPTION OF THE PRIOR ART

The progress of cargo delivery allows people to realize movement and transportation of various of objects, such documents and articles, through shipping delivery, and consequently, a huge amount of packaging materials are consumed for such a purpose. Such objects involve a large number of types, and particularly, for the fragile objects, honeycomb cell shock-protection paper pads have been widely used for packaging of such objects in shipping and transportation.

In the known technology, shock-protection materials are either shock-absorbing board or block, or bubble bags, or honeycomb cell shock-protection paper pads, which are applied to realize shock-protection packaging for fragile objects. The two former shock-protection packaging measures have various problems, such as bulkiness, non-environmental-friendliness, and difficulty of recycling and recovery of packaging wastes. The honeycomb cell shock-protection paper pad must be first stretched and extended before it can provide an effect of shock absorption. The known technology stretches and extends the honeycomb cell shock-protection paper pad by applying machinery or manually. The paper-made cellular-form shock-protection pad is generally elastic, and after the paper-made cellular-form shock-protection pad has been stretched and extended, the paper-made cellular-form shock-protection pad so stretched and extended may restore back to the original shape by means of the elasticity, if the stretched and extended paper-made cellular-form shock-protection pad is not properly restrained. This often causes troubles to users.

SUMMARY OF THE INVENTION

The present invention is made to overcome the paper-made cellular-form shock-protection pad, after being stretched and extended, restoring back to an original shape before stretching and extending due to elasticity. Being developed on the basis of a known structure of honeycomb cell shock-protection paper pad, the present invention changes a known structure of paper-made cellular-form shock-protection pad by means of shaping technology so as to realize shape fixing of the paper-made cellular-form shock-protection paper pad after being stretched and extended to hold the fixed shape of the paper-made cellular-form shock-protection paper pad to prevent restoration thereof back to an original state before stretching and extending. To resolve the above issue, the present invention discloses a honeycomb cell shock-protection paper pad structure, and a fabrication method and a fabrication apparatus.

The techniques adopted in the present invention to realize such purposes are as follows:

A honeycomb shock-protection paper pad structure is provided, wherein the shock-protection paper pad structure is formed of a group of paper strips that are connected together in a uniformly distributed and spaced manner so as to exhibit a honeycomb cellular structure at ends.

The paper strips exhibit a honeycomb cellular structure at the ends, and the paper strips is provided with folded-edge bend portions at upper and lower ends of an unconnected site thereof, and the paper strip is provided with a central bend portion at a connected site thereof.

A honeycomb cell shock-protection paper pad shape-fixing method is provided, wherein the method is performed to stretch and extend a contracted cellular-form shock-protection paper pad that is formed of a group of parallel arranged paper strips connected to each other in a uniformly distributed and spaced manner, and comprises the following steps:

Step A1, stretching and extending the contacted cellular-form shock-protection paper pad to spread to form a honeycomb cell shock-protection paper pad in a form of paper strips being of a hexagonal shape and connected in a uniformly distributed and spaced manner;

Step A2, feeding the honeycomb cell shock-protection paper pad in a state of stretching stress being kept fixed into an edge-collapsing scraper blade to make upper and lower ends of the paper strips that are stretched and extended in the hexagonal shape bent to one side; and Step A3, feeding the cellular-form shock-protection paper pad of Step A2 of which the hexagonally-shaped paper strips have an edge configuration that the upper and lower ends exhibit bending toward one side into a pair of paired rollers having a designated gap therebetween to implement shape-fixing rolling to form a honeycomb cell shock-protection paper pad that has a designated thickness, with the paper strips forming bends of folded edges on the upper and lower ends at an unconnected sites and the paper strips forming a central bend at a connected site.

The designated gap of the paired rollers for the operation of shape-fixing rolling is such that a distance between outer circles of the paired rollers is less than or equal to 30-50% of a thickness of the honeycomb cell shock-protection paper pad before entry into the paired rollers.

A honeycomb cell shock-protection paper pad shape-fixing apparatus comprises: a chassis portion, an edge scraper portion, and a shape-fixing roller portion.

The edge scraper portion comprises: a flexible upper scraper blade and a flexible lower scraper blade. The flexible upper scraper blade and the flexible lower scraper blade are mounted obliquely on the chassis portion. A distance between the flexible upper scraper blade and the flexible lower scraper blade is less than a thickness of the honeycomb cell shock-protection paper pad.

The shape-fixing roller portion comprises: rigid shaping paired rollers, the rigid shaping paired rollers being mounted on the chassis portion, a distance between outer circles of the rigid shaping paired rollers being less than or equal to 30-50% of a thickness of the honeycomb cell shock-protection paper pad before entry into the rigid shaping paired roller.

The efficacy of the present invention is as follows:

A honeycomb shock-protection paper pad structure has advantages of having a simplified structure, being not deformable, and being easy to operate.

A honeycomb cell shock-protection paper pad shape-fixing method, the method being easy and allowing stretching and shape fixing to be done in one process.

A honeycomb cell shock-protection paper pad shape-fixing apparatus has a simple structure and a high efficiency.

A detailed description of the present invention will be provided below with reference to the attached drawings.

DETAILED DESCRIPTION OF THE PREFERRED EMBODIMENT

Figure 1:
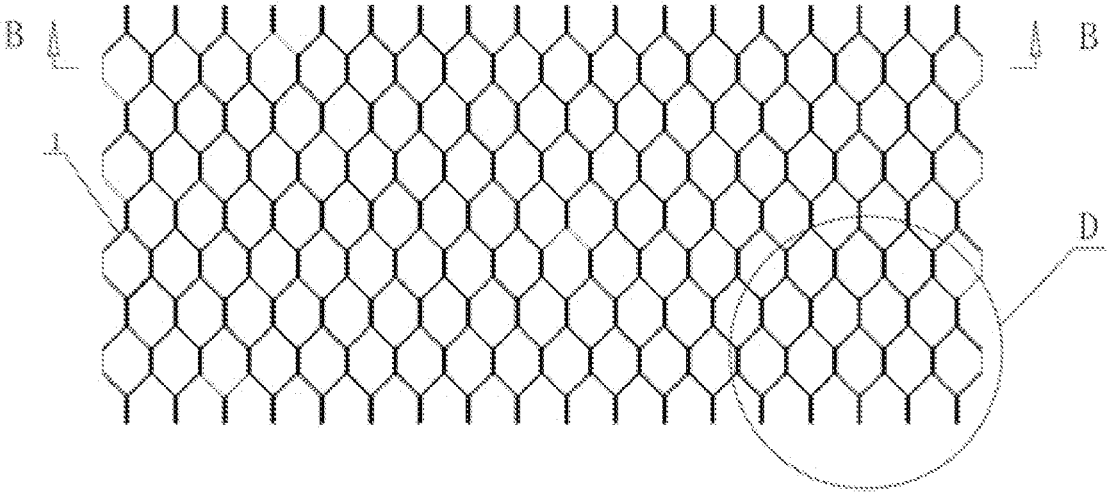
FIG. 1 is a schematic view showing a honeycomb cell shock-protection paper pad structure according to the present invention.
Figure 2:
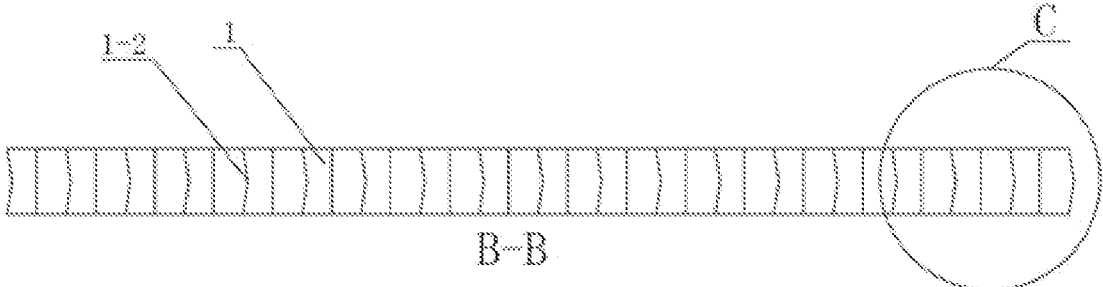
FIG. 2 is a schematic cross-sectional view taken along line B-B of FIG. 1.
Figure 3:
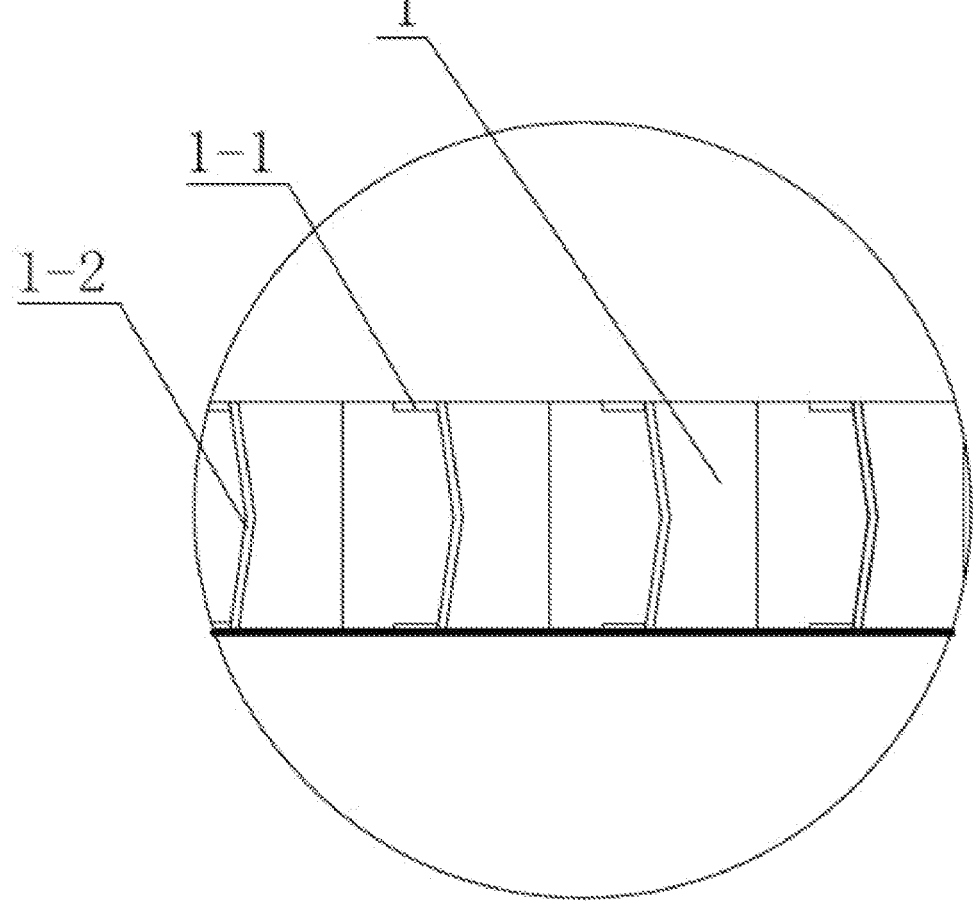
FIG. 3 is schematic enlarged view showing Portion C of FIG. 2.
Figure 4:
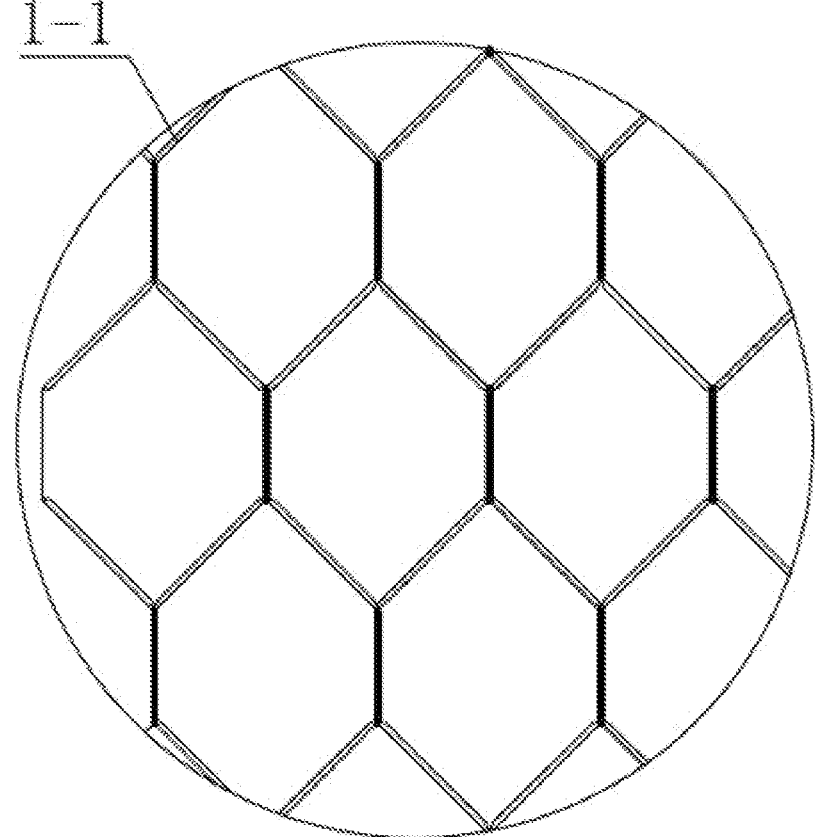
FIG. 4 is schematic enlarged view showing Portion D of FIG. 1.
Figure 5:
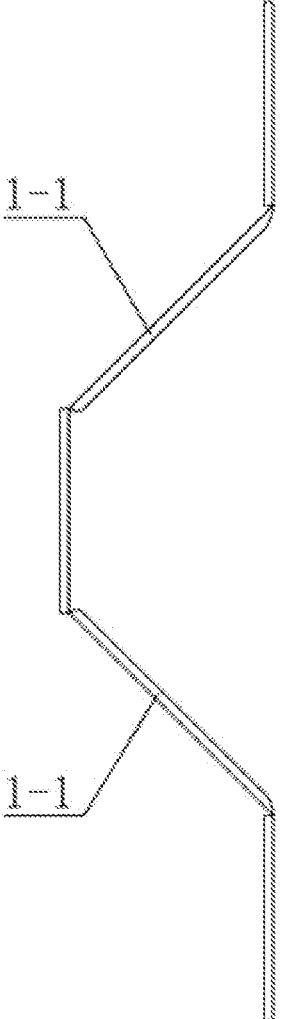
FIG. 5 is a schematic view showing a structure of a paper strip of the honeycomb cell shock-protection paper pad structure according to the present invention.
Figure 6:
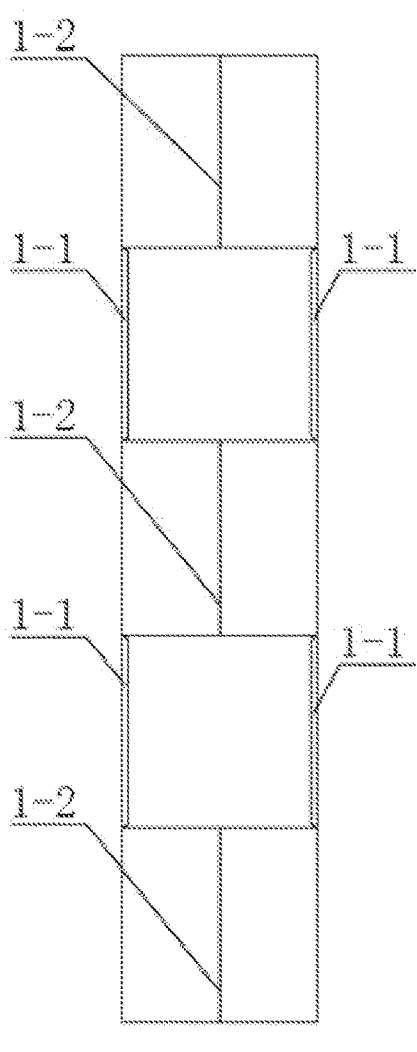
FIG. 6 is a left side view of FIG. 5.
Figure 7:
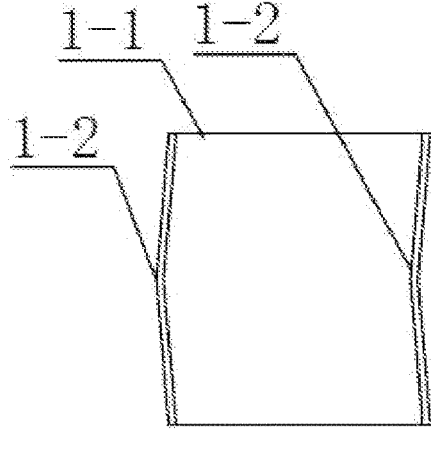
FIG. 7 is a top plan view of FIG. 5.
Figure 8:
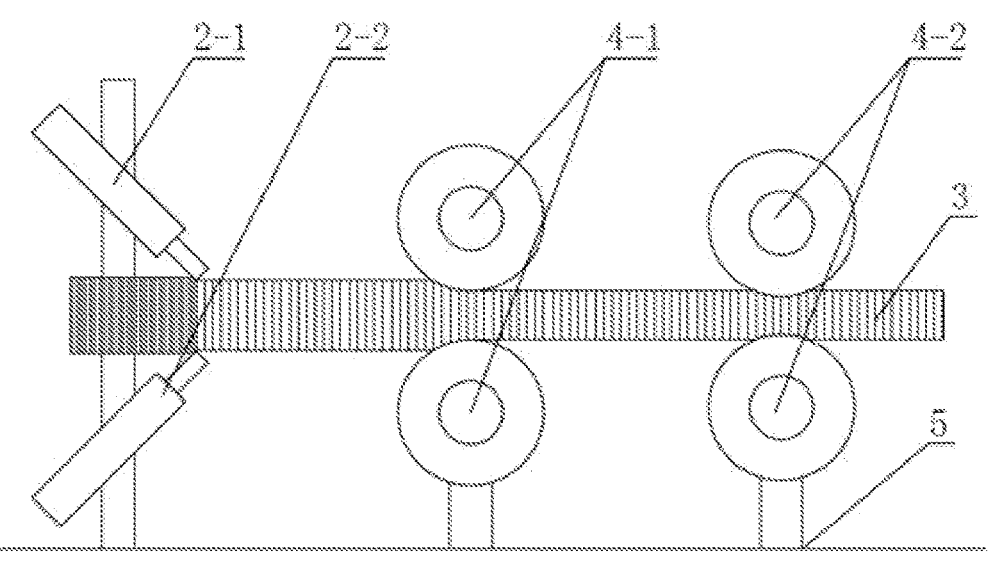
FIG. 8 is a schematic view showing a structure of a honeycomb cell shock-protection paper pad shape fixing device according to the present invention.
Figure 9:
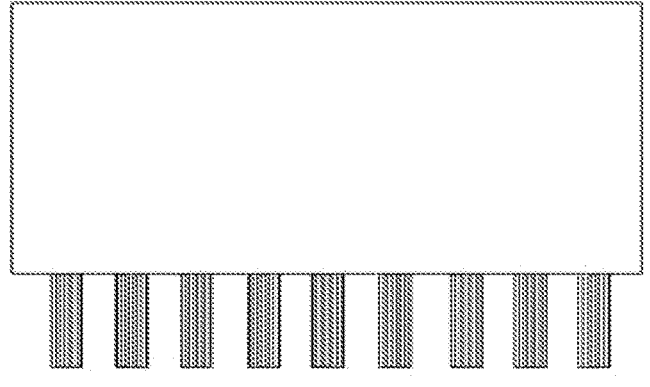
FIG. 9 is a schematic view showing a structure of flexible upper and lower scraper blades according to EMBODIMENT 1.
Figure 10:
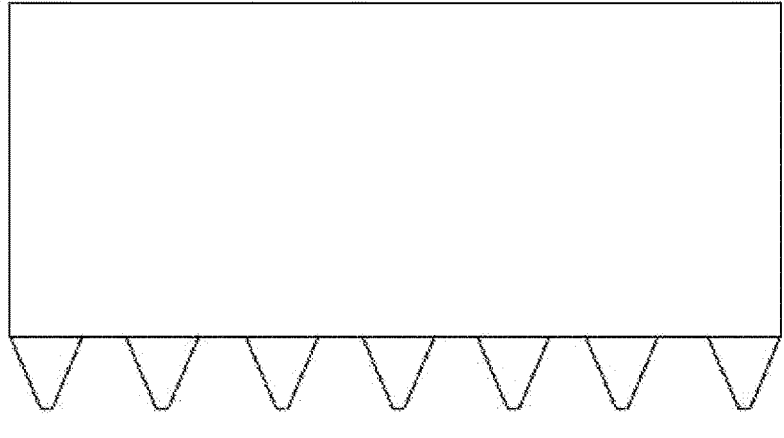
FIG. 10 is a schematic view showing a structure of flexible upper and lower scraper blades according to EMBODIMENT 2.

Reference is now made to the attached drawings.

A honeycomb cell shock-protection paper pad structure is provided, wherein the shock-protection paper pad structure is formed of a group of paper strips that are connected together in a uniformly distributed and spaced manner so as to exhibit a honeycomb cellular structure at ends. The paper strips 1 exhibit a honeycomb cellular structure at the ends, and the paper strip 1 is provided with folded-edge bend portions 1-1 at upper and lower ends of an unconnected site thereof, and the paper strip 1 is provided with a central bend portion 1-2 at a connected site thereof.

The paper strip 1 is provided, at upper and lower ends of the unconnected site, the folded-edge bend portion 1-1 and the paper strip 1 is provided, at the connected site, with the central bend portion 1-2, so that after being shaped by means of the upper and lower ends being provided with the folded-edge bend portions 1-1 and the paper strips 1 being provided with the central bend portions 1-2 at the connected sites, the honeycomb cell shock-protection paper pad 3 is kept from restoring an original state that the paper strips 1 are parallel with each other and are close to each other, and an shock-absorbing effect of the honeycomb cell shock-protection paper pad 3 is enhanced.

A honeycomb cell shock-protection paper pad shape-fixing method is provided. The method is performed to stretch and extend a contracted cellular-form shock-protection paper pad that is formed of a group of parallel arranged paper strips connected to each other in a uniformly distributed and spaced manner, and comprises the following steps:

Step A1, stretching and extending the contacted cellular-form shock-protection paper pad to spread to form a honeycomb cell shock-protection paper pad in a form of paper strips being of a hexagonal shape and connected in a uniformly distributed and spaced manner.

The purpose of Step A1 is to initially achieve a stretched and extended state.

Step A2, feeding the honeycomb cell shock-protection paper pad in a state of stretching stress being kept fixed into an edge-collapsing scraper blade to make upper and lower ends of the paper strips that are stretched and extended in the hexagonal shape bent to one side.

The edge-collapsing scraper blade operates on the honeycomb cell shock-protection paper pad in the stretched and extended state such that under an action of the edge-collapsing scraper blade, the honeycomb cell shock-protection paper pad is caused to form a uniformly extended state after stretching, and also, the edge-collapsing scraper blade causes the upper and lower ends of the stretched hexagonally-shaped paper strip to exhibit a trend of commonly bending toward one side, as a preparation of pre-step operation for bending and shaping in the next step.

Step A3, feeding the cellular-form shock-protection paper pad of Step A2 of which the hexagonally-shaped paper strips have an edge configuration that the upper and lower ends exhibit bending toward one side into a pair of paired rollers having a designated gap therebetween to implement an operation of shape-fixing rolling to form a honeycomb cell shock-protection paper pad that has a designated thickness, with the paper strips forming bends of folded edges on the upper and lower ends at an unconnected sites and the paper strips forming a central bend at a connected site.

The shape-fixing rolling implemented with the paired rollers makes the paper strips that have been processed in Step A2 to pass the paired rollers in a state in which the upper and lower ends exhibit a trend of commonly bending toward one side so as to have the upper and lower ends of the paper strips at the unconnected site forming the folded-edge bends.

The designated gap of the paired rollers for the operation of shape-fixing rolling is such that a distance between outer circles of the paired rollers is less than or equal to 30-50% of a thickness of the honeycomb cell shock-protection paper pad before entry into the paired rollers.

In an embodiment of the present invention, the operation of shape-fixing rolling implemented in Step 3 is repeatedly performed for 2-3 time, in order to ensure that the folded-edge bend so formed does not elastically restore the shape of the folded-edge bend.

In an embodiment of the present invention, in Step A3, one pair of the paired rollers are hot rollers that carry out hot roller pressing on the upper and lower ends of the unconnected site of the paper strips to form the folded-edge bend.

Ae honeycomb cell shock-protection paper pad shape-fixing apparatus comprises a chassis portion, an edge scraper portion, and a shape-fixing roller portion.

The edge scraper portion comprises: a flexible upper scraper blade 2-1 and a flexible lower scraper blade 2-2. The flexible upper scraper blade 2-1 and the flexible lower scraper blade 2-2 are mounted obliquely on the chassis portion 5. A distance between the flexible upper scraper blade 2-1 and the flexible lower scraper blade 2-2 is less than a thickness of the honeycomb cell shock-protection paper pad 3.

The purpose of arrangement of the flexible upper scraper blade 2-1 and the flexible lower scraper blade 2-2 is to uniformly extend the honeycomb cell shock-protection paper pad 3 and also, the upper and lower ends of the paper strips are set in a trend of commonly bending toward one side in order to make preparation for the paired rollers to carry out an operation of forming the upper and lower ends of the unconnected site of the paper strips into folded-edge bends.

The shape-fixing roller portion comprises: rigid shaping paired rollers 4-1. The rigid shaping paired rollers 4-1 are mounted on the chassis portion 5. A distance between the outer circles of the rigid shaping paired rollers 4-1 is less than or equal to 30-50% of a thickness of the honeycomb cell shock-protection paper pad 3 before entry into the rigid shaping paired rollers 4-1.

In an embodiment of the present invention, the shape-fixing roller portion further comprises: secondary rigid shaping paired rollers 4-2. The secondary rigid shaping paired rollers 4-2 are mounted on the chassis portion 5. A distance between the outer circles of the secondary rigid shaping paired rollers 4-2 is less than or equal to 50-65% of a thickness of the honeycomb cell shock-protection paper pad 3 before entry into the secondary rigid shaping paired roller 4-2. An entry end of the secondary rigid shaping paired rollers 4-2 is set to correspond to an exit end of the rigid shaping paired rollers 4-1. The secondary rigid shaping paired rollers 4-2 provide a certain effect of further fixing the shape of the folded-edge bends.

In an embodiment of the present invention, the flexible upper scraper blade 2-1 and the flexible lower scraper blade 2-2 are bristle brushes or flexible plates with teeth. The flexible upper scraper blade 2-1 and the flexible lower scraper blade 2-2 ensure that, during operation, no damage is caused on the honeycomb cell shock-protection paper pad 3.

In an embodiment of the present invention, the rigid shaping paired rollers 4-1 or the secondary rigid shaping paired rollers 4-2 are hot rollers.

I claim:

1. A honeycomb cell shock-protection paper pad structure for packaging, wherein the shock-protection paper pad structure comprises a honeycomb cellular structure having hexagonal cells that is formed of a group of paper strips connected together in a uniformly distributed and spaced manner and has upper and lower surfaces, each of the paper strips comprising connected portions and unconnected portions alternately arranged in a lengthwise direction of the paper strip, wherein each of the connection portions is connected to another one of the paper strips to form a connected site of the paper strip, and each of the unconnected portions forms an unconnected site of the paper strip, wherein each of the paper strips (1) includes upper and lower edges respectively extending along the upper and lower surfaces of the honeycomb cellular structure and respectively defining upper and lower ends, and each of the paper strips (1) is provided with folded-edge bend portions (1-1) at the upper and lower ends of the unconnected sites thereof, and the paper strip (1) is provided with a central bend portion (1-2) at a portion of the connected sites thereof between and spaced from the upper and lower edges, wherein the central bend portion is set at a portion of the connected site adjacent to a portion of the unconnected site between the folded-edge bend portion at the upper end and the folded-edge bend portion at the lower end in a direction extending between the upper end and the lower end, wherein the central bend portion is formed on the connected site and extends in a direction parallel to the lengthwise direction of the paper strip; and the folded-edge bend portions are provided on the upper and lower edges on the unconnected site and extend in a direction parallel to the lengthwise direction of the paper strip, the central bend portion being located between and spaced from the folded-edge bend portions of the upper and lower edges in the direction extending between the upper end and the lower end.

* * * * *